United States Patent [19]

Balfanz

[11] 4,372,538
[45] Feb. 8, 1983

[54] METAL CUTTING MACHINE WITH CUT PIECE PICKUP AND TRANSPORT MAGNETS

[75] Inventor: Fredrick J. Balfanz, Waukesha, Wis.

[73] Assignee: C-R-O, Inc., Menomonee Falls, Wis.

[21] Appl. No.: 222,576

[22] Filed: Jan. 5, 1981

[51] Int. Cl.³ .............................................. B23K 7/10
[52] U.S. Cl. .................................... 266/69; 198/690;
        266/70; 414/751
[58] Field of Search ....................... 266/50, 58, 59, 60,
        266/64, 67, 69, 70; 414/751, 752; 198/690, 488

[56] References Cited

U.S. PATENT DOCUMENTS

| | | | |
|---|---|---|---|
| 675,323 | 5/1901 | Clark | 335/290 |
| 1,176,584 | 3/1916 | Madgett | 266/70 |
| 2,363,007 | 11/1944 | Kohlhafer et al. | 266/23 |
| 2,726,752 | 12/1955 | Maher | 198/690 |
| 2,729,344 | 1/1956 | Birchall | 214/8.5 |
| 3,434,370 | 3/1969 | Scholl et al. | 266/58 |
| 3,856,157 | 12/1974 | Hill | 214/1 BT |
| 3,866,892 | 2/1975 | Hooper | 266/23 K |
| 4,012,027 | 3/1977 | Hooper | 266/58 |
| 4,021,025 | 5/1977 | Frame | 266/58 |
| 4,051,796 | 10/1977 | Itani et al. | 266/69 |
| 4,139,180 | 2/1979 | Itani et al. | 266/69 |

*Primary Examiner*—John P. Sheehan
*Attorney, Agent, or Firm*—Andrus, Sceales, Starke & Sawall

[57] ABSTRACT

A metal cutting machine has a plurality of tool carrying cutting heads mounted for movement along a bridge which in turn is mounted on rails or the like for movement transverse to the direction of head movement. Controls are provided for selective movement of the heads and bridge. A bridge-mounted plurality of magnet assemblies are provided which, after one or more cut pieces have been formed from a plate-like workpiece by the heads, are actuated to engage the cut pieces and raise them from the remaining skeletal workpiece. The bridge on which the magnet assemblies are mounted is movable to a position remote from the workpiece so that the magnets can deposit the cut pieces at a receiving point. The assemblies may be mounted on the same bridge as the cutting heads and connected to the latter for selective horizontal positioning by the same controls used for cutting. Alternately, the assemblies may be mounted on a separate bridge disposed on the same rails.

5 Claims, 9 Drawing Figures

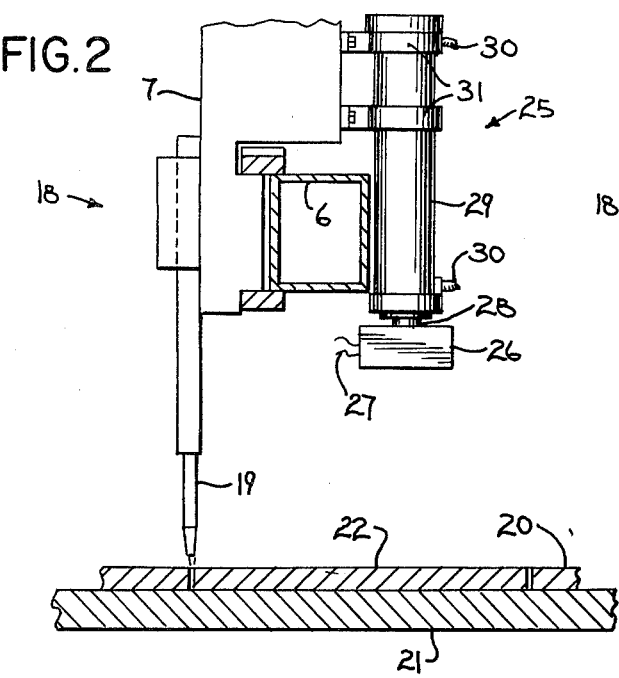
FIG. 2
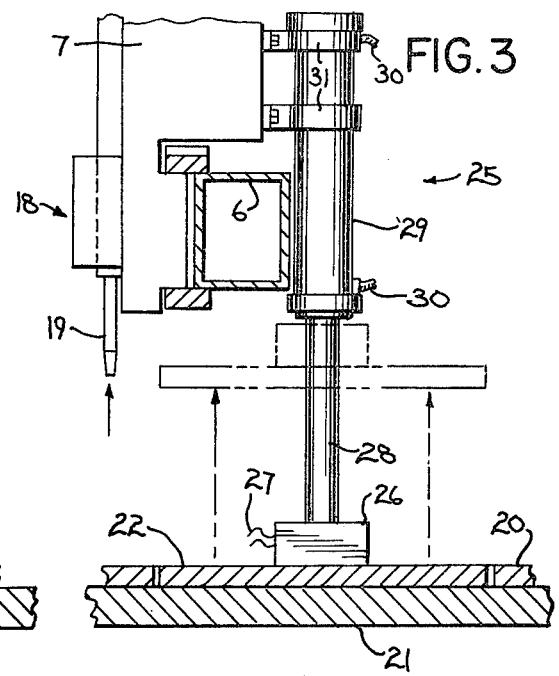
FIG. 3
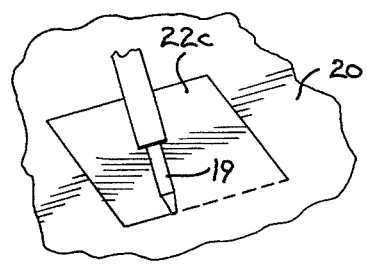
FIG. 4a
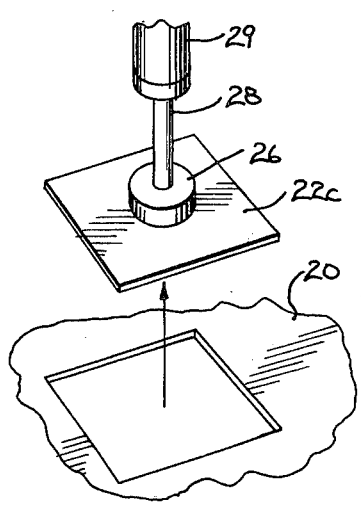
FIG. 4b
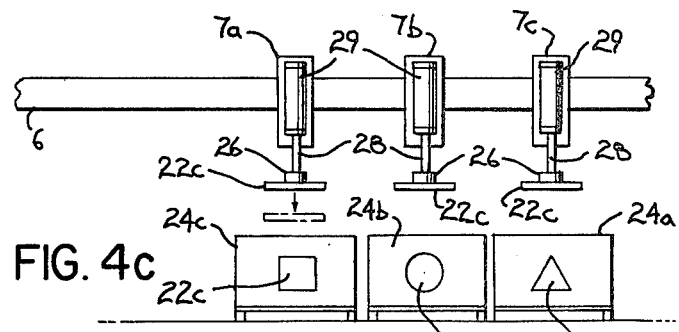
FIG. 4c
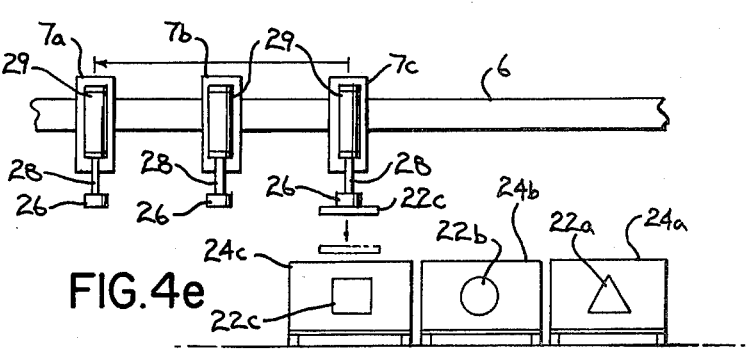
FIG. 4d
FIG. 4e

METAL CUTTING MACHINE WITH CUT PIECE PICKUP AND TRANSPORT MAGNETS

U.S. PRIOR ART OF INTEREST

| Inventor | U.S. Pat. Nos. | Issue Date |
| --- | --- | --- |
| Clark | 675,323 | May 28, 1901 |
| Kohlhafer et al | 2,363,007 | Nov. 21, 1944 |
| Birchall | 2,729,344 | Jan. 3, 1956 |
| Hill | 2,856,157 | Dec. 24, 1974 |
| Hooper | 3,866,892 | Feb. 18, 1975 |
| Hooper | 4,012,027 | March 15, 1977 |
| Itani et al | 4,139,180 | Feb. 13, 1979 |

BACKGROUND AND SUMMARY OF THE INVENTION

This invention relates to a metal cutting machine with cut piece pickup and transport magnets.

Metal cutting machines using flame cutting torches or the like have long been known for cutting a plurality of relatively small pieces from a large metal plate. See, for example, U.S. Pat. Nos. 3,866,892 and 4,012,027. Such machines may utilize the well-known numerical control, photoelectric tracers and the like for controlling the movement of the cutting heads.

Subsequent to cutting, the cut pieces must be removed from the plate and transported to another location.

The cut pieces are usually of very heavy steel and may range in weight from about 4-5 pounds to several hundred pounds each. The pieces are usually too heavy for an operator to manually handle.

It is known to remove cut pieces one-at-a-time from the skeletal plate by use of an overhead crane from which an electromagnet is suspended. The U.S. Pat. No. 675,323 is illustrative of a crane type magnetic device.

It is furthermore known to utilize an electromagnet in a metal cutting machine for holding a part of a workpiece in place while a torch cuts the piece out by moving around the periphery of the magnet, as in U.S. Pat. No. 2,363,007.

Additionally, it is known to use electromagnets for picking up and transporting large metal objects in breaking up large ships and the like, as in U.S. Pat. No. 4,139,180. Furthermore, magnets are used for transport of stacks of cans, as in U.S. Pat. No. 2,729,344, and in other material handling devices such as in U.S. Pat. No. 3,856,157.

It is a task of the present invention to provide a multiple-piece type metal cutting machine having thereon a simple, yet effective means for removing one or a plurality of previously cut pieces from the skeletal workpiece and for transporting the pieces to a suitable receiving station.

It is a further task of the invention to provide selectivity as to which cut piece or pieces are to be handled at any given time in the overall process of removing all the cut pieces from the skeletal workpiece.

The invention is contemplated for use in a metal cutting machine having a plurality of tool carrying cutting heads mounted for movement along a bridge which in turn is mounted on rails or the like for movement transverse to the direction of head movement. Controls are provided for selective movement of the heads and bridge.

A bridge-mounted plurality of magnet assemblies are provided which, after one or more cut pieces have been formed from a plate-like workpiece by the heads, are actuated to engage the cut pieces and raise them from the remaining skeletal workpiece. The bridge on which the magnet assemblies are mounted is movable to a position remote from the workpiece so that the magnets can deposit the cut pieces at a receiving point.

It is contemplated that the assemblies may be mounted on the same bridge as the cutting heads and connected to the latter for selective horizontal positioning by the same controls used for cutting. Alternately, the assemblies may be mounted on a separate bridge disposed on the same rails.

BRIEF DESCRIPTION OF THE DRAWINGS

The accompanying drawings illustrate the best mode presently contemplated by the inventor for carrying out the invention.

In the drawings:

FIG. 2 is a section taken on line 2—2 of FIG. 1 and showing one of the magnet assemblies in retracted position during cutting;

FIG. 3 is a view similar to FIG. 2 and showing the engagement and pickup of a cut piece after cutting;

FIGS. 4a–4e are schematic sequential showings from the step of cutting, through pickup to deposit of cut pieces at the receiving point.

DESCRIPTION OF THE PREFERRED EMBODIMENT

Figures 1, 5:
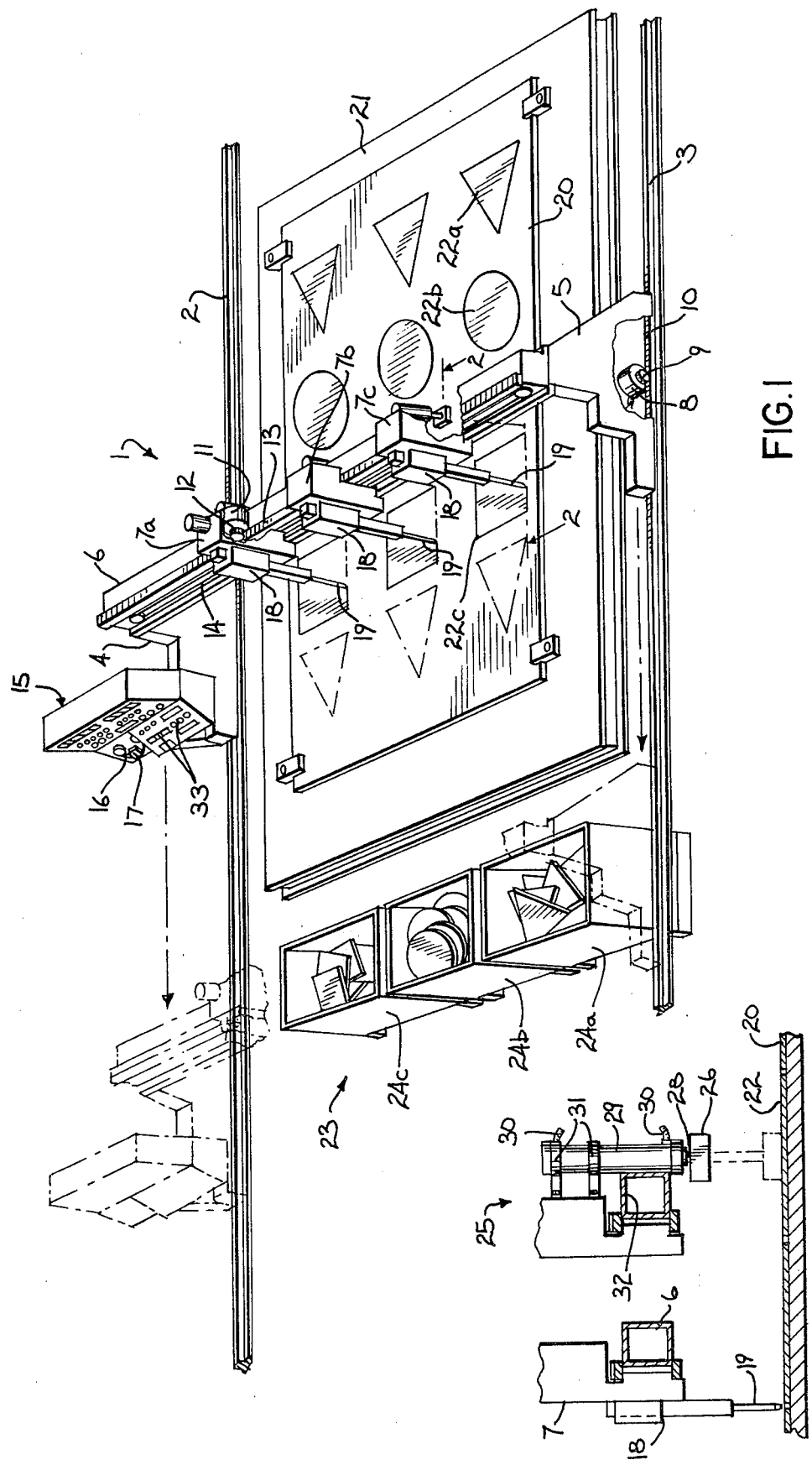
FIG. 1 is a perspective view of a metal cutting machine which incorporates the concepts of the invention.
FIG. 5 illustrates a second embodiment of machine.

The preferred embodiment incorporating the concepts of the invention is illustrated in FIGS. 1-3 wherein a metal cutting machine 1 is adapted to be mounted on a pair of longitudinal support rails 2 and 3 which are secured to the floor. Support gantries 4 and 5 are mounted for movement along the respective rails, with the gantries supporting the ends of a transverse support or bridge 6 which normally extends over the cutting area. A plurality of carriages 7a, 7b and 7c are suitably mounted for movement along bridge 6.

Bridge 6 is adapted to be driven along support rails 2, 3 by any suitable motive means such as motor 8 which is mounted in gantry 5 and which has a pinion 9 which meshes with a rack 10 disposed along rail 3. Support gantry 4 contains similar motive means (not shown) to insure even and parallel movement of the gantries.

Similarly, carriage 7a is adapted to be driven along bridge 6 by any suitable motive means such as a motor 11 on the carriage which has a pinion 12 which meshes with a rack 13 disposed on the bridge. Carriage 7a is designated the master carriage and is permanently secured to an endless movable band 14. Carriages 7b and 7c are designated as slave carriages and are selectively engaged with movable band 14 to vary the spacing between the carriages.

An input control programming device is provided to control the operation of motors 8 and 11, the engagement of slave carriages 7b and 7c with band 14 and other elements to be described. The device may be of any desired well-known type such as a photoelectric tracer, but in the present embodiment is shown as a numerical control system. As shown schematically in FIG. 1, an input control unit 15 is used to program and operate the numerical control equipment, which includes paper or magnetic tape 16 which passes through the usual pickup head section 17 to create an output for driving the aforesaid motors through suitable lines at a speed and in the direction desired to create programmed paths for carriages 7.

Each carriage 7 mounts a cutting head 18 on its front side and which in this embodiment includes a flame cutting torch 19 supplied with electricity and gas from the usual sources, not shown. Torches 19 are adapted to be selectively actuated from input control unit 15 in the usual manner. Torches 19 are adapted to cut a flat plate-like metal workpiece 20 mounted on a supporting table 21.

In the present instance, input control unit 15 is programmed to operate the machine so that torches 19 will cut a plurality of small individual pieces 22 from workpiece 20. The pieces may all be identical, but FIG. 1 illustrates them as in multiple transverse rows of different shape, namely triangles 22a, circles 22b and rectangles 22c. Since slave carriages 7b and 7c follow the same path as master carriage 7a, all the pieces in one row must be of the same shape.

It is contemplated that machine 1 incorporates means for selectively removing the cut pieces 22 from workpiece 20 and transporting them to a receiving station 25 remote from the workpiece. In the present embodiment, the receiving station 23 is disposed between rails 2 and 3 and adjacent one end of table 21. Station 23 may comprise the floor or otherwise holding means for cut pieces 22. In view of the multiple shapes involved with the present embodiment, the holding means is shown as comprising a plurality of bins 24a, 24b, 24c for respectively receiving the separate cut pieces 22a, 22b and 22c.

The removing and transporting means comprises, in the present embodiment, a magnet assembly 25 mounted on the rear side of each carriage 7a–7c and thus connected to its respective cutting head 18 for movement therewith along bridge 6. Each magnet assembly 25 comprises, as best shown in FIGS. 2 and 3, an electromagnet 26 connected via suitable wires 27 to a source of electricity, which can be selectively actuated by input control 15. Each magnet 26 is disposed for vertical movement relative to workpiece 20. For this purpose, the magnet is mounted to the piston rod 28 of a suitable motive means such as pneumatic or hydraulic cylinder 29 having lines 30 connected to a valved pressure fluid source, not shown, which is adapted to be actuated by input control unit 15.

Cylinder 29 is secured to the rear side of the respective carriage 7a–7c by suitable clamps 31.

Referring particularly to FIGS. 2 and 4a, when the pieces 22 are being flame cut from workpiece 20, torch 19 is in the down position adjacent the workpiece, while electromagnets 26 on the side of bridge 6 remote from the torches are retracted and inoperative. Once the cut pieces have been formed as in FIG. 1, and referring particularly to FIG. 3, torches 19 are retracted. Then, and in accordance with the particular program of input control unit 15, at least one electromagnet 26 is lowered into engagement with a cut piece 22 and after the piece is magnetically clamped thereto by actuation of the magnet, the magnet is raised upwardly away from workpiece 20. See also FIG. 4b.

Although one individual cut piece 22 could be removed and transported from workpiece 20 at a time, it is expected that a multiplicity of pieces will be removed, in any sequence desired. The programmed control can cause transport of a plurality of cut pieces to a receiving station 23, all at one time, where they can be simultaneously released. However, in the showing of FIG. 1 and FIGS. 4a–4e it is contemplated that only square cut pieces 22c are to be handled during one cycle of operation, leaving the remaining pieces 22a and 22b for later.

For this purpose, after pickup, motor 8 is actuated to move bridge 6 so that it is in the position shown in phantom in FIG. 1, that is, remote from table 21 and above station 23. The program also actuates motors 11 to bring the left bridge-mounted magnet assembly 25 over square piece bin 24c, where its piece 22c is released to drop into the bin, as shown in FIG. 4c. The program then engages carriage 7b with moving band 14 so that center assembly 25 moves over bin 24c and drops its piece, as in FIG. 4d. And finally, the same thing occurs with carriage 7c and right assembly 25, as shown in FIG. 4e.

Motors 8 and 11 are then actuated to return bridge 6 and assemblies 25 to over the now skeletal workpiece 19 for the next cycle of piece removal.

The system is very flexible in operation. For example, if it is desired to deposit one of each shape of cut piece 22 at station 23 simultaneously, left magnet assembly 25 could pick up left triangle 22a, middle assembly 25 could pickup middle circle 22b and right assembly 25 could pick up right rectangle 22c. Bridge 6 could then be moved over station 23 and all three cut pieces could be deposited at once into their respective bins 24a,b,c.

FIGS. 1–3 illustrate an embodiment wherein the bridge-mounted magnet assemblies 25 are disposed on the same bridge as cutting heads 18 so that they are fixedly connected together through their respective mounting carriages 7a–7c. Thus they can share a common positioning control. However, in some instances it may be desirable for assemblies 25 to be mounted on a similar secondary bridge 32 which is spaced from and parallel to the main torch carrying bridge 6. See FIG. 5. In this instance, additional controlling functions would be necessary.

It may also be desirable to mount magnet assemblies 25 on bridge 6 or 32 in such a way that once adjusted for proper spacing they could be locked into position. Such would be the case when pieces of only one shape were being cut from workpiece 20, thus eliminating the need for horizontal movement of magnet assemblies 25 along the bridge.

Furthermore, while the selective operation of the device is preferably of the programmed automatic type, at least part of the cycle (such as cut piece pickup, transfer and deposit) may be manually controlled, as by control switches 33 on the face of unit 15.

The concepts of the invention provide a unique system of removing small pieces cut from a metal workpiece and transporting them to a desired location. By utilizing portions of the cutting machine itself, significant economies are obtained.

Various modes of carrying out the invention are contemplated as being within the scope of the following claims particularly pointing out and distinctly claiming the subject matter which is regarded as the invention.

I claim:

1. In a machine for cutting a plurality of separate pieces from a metal workpiece:
   (a) longitudinally extending support means,
   (b) a plurality of carriages adapted to be positioned adjacent the workpiece and movable in a transverse direction, (c) cutting tools mounted on said carriages for forming a plurality of individual cut pieces from the workpiece,
(d) a transversely extending bridge adapted to be positioned adjacent the workpiece and movable along said support means, said carriages being mounted for movement along said bridge,
(e) a plurality of electromagnetic means comprising magnet assemblies mounted on said carriages for selectively picking up said cut pieces from said workpiece,
(f) means for moving said bridge and electromagnetic means from adjacent the workpiece to a station remote from the said workpiece,
(g) and means for activating said electromagnetic means for cut-piece pickup, and for de-activating said electromagnetic means for release of the cut pieces at said remote station.

2. The cutting machine of claim 1 wherein said carriages are moved along said bridge in response to an input control unit, the construction being such that control of carriage movement also controls movement of said cutting tools and said electromagnetic means.

3. The cutting machine of claim 1 wherein:
(a) said cutting tools are disposed on one side of said bridge,
(b) and said magnet assemblies are disposed on the side of said bridge opposite said cutting tools.

4. The cutting machine of claims 1, 2 or 3 wherein said means for activating and de-activating said electromagnetic means is constructed so that said cut pieces are selectively picked up or released individually or in multiples.

5. The cutting machine of claims 1, 2 or 3 wherein said bridge moving means, and activating and de-activating means, are selectively actuatable in response to an input control unit.

* * * * *